United States Patent
Yasunaga et al.

(10) Patent No.: US 8,310,743 B2
(45) Date of Patent: Nov. 13, 2012

(54) IMAGE FORMING APPARATUS AND DENSITY UNEVENNESS CORRECTION METHOD THEREIN

(75) Inventors: Yutaka Yasunaga, Hachioji (JP); Mieko Ohkawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 412 days.

(21) Appl. No.: 12/635,364

(22) Filed: Dec. 10, 2009

(65) Prior Publication Data

US 2010/0149564 A1 Jun. 17, 2010

(30) Foreign Application Priority Data

Dec. 12, 2008 (JP) ................................. 2008-316468

(51) Int. Cl.
G03F 3/08 (2006.01)
(52) U.S. Cl. ......... 358/518; 358/1.9; 358/1.16; 358/521
(58) Field of Classification Search .................. None
See application file for complete search history.

(56) References Cited

U.S. PATENT DOCUMENTS

| 6,088,050 | A | * | 7/2000 | Ng | 347/237 |
| 2005/0006486 | A1 | * | 1/2005 | Koifman et al. | 235/494 |
| 2006/0181554 | A1 | * | 8/2006 | Otsuki | 347/5 |
| 2006/0279597 | A1 | * | 12/2006 | Ishimoto et al. | 347/16 |
| 2007/0064038 | A1 | * | 3/2007 | Arai et al. | 347/19 |
| 2009/0040256 | A1 | * | 2/2009 | Baba et al. | 347/14 |
| 2009/0073469 | A1 | * | 3/2009 | Kita et al. | 358/1.9 |

FOREIGN PATENT DOCUMENTS

JP 2005-246646 9/2005

* cited by examiner

*Primary Examiner* — Marivelisse Santiago Cordero
*Assistant Examiner* — Miya J Cato
(74) *Attorney, Agent, or Firm* — Finnegan, Henderson, Farabow, Garrett & Dunner, L.L.P.

(57) ABSTRACT

Disclosed is an image forming apparatus including: an image forming section to form an image on paper based on image data according to an image forming condition to output the image on the paper; a storage section to store a plurality of correction values corresponding to setting conditions of the image forming condition, the correction values used for correction of density unevenness in a main scanning direction of the image; a density correction section to perform correction of density of each pixel of the image data based on the correction value; and a control section to read out the correction value according to a set condition in the image forming condition from the storage section and to allow the density correction section to perform the correction of the density of each pixel of the image data based on the read out correction value.

18 Claims, 16 Drawing Sheets

FIG.4

| NO. | IMAGE FORMING CONDITION | | | | | CORRECTION VALUE | | | | | | | | |
|---|---|---|---|---|---|---|---|---|---|---|---|---|---|---|
| | PAPER TYPE | BASIS WEIGHT (g/m²) | NO. | SCREEN PROCESSING | NO. | OUTPUT COLOR | 0 | 1 | 2 | 3 | 4 | 5 | 6 | 7 | 8 |
| 0 | HIGH QUALITY PAPER | 64-74 | 0 | LINE | 0 | Y | 31 | 31 | 31 | 00 | 00 | 00 | -31 | -31 | -31 D |
| | | | | | 1 | M | 00 | 00 | 00 | 00 | 00 | 00 | 00 | 00 | 00 |
| | | | | | 2 | C | FF | FF | FF | FF | FF | FF | FF | FF | FF |
| | | | | | 3 | K | FF | FF | FF | FF | FF | FF | FF | FF | FF |
| | | | 1 | DOT | ⋮ | ⋮ | ⋮ | ⋮ | ⋮ | ⋮ | ⋮ | ⋮ | ⋮ | ⋮ | ⋮ |
| | | | 2 | ERROR DIFFUSION | ⋮ | ⋮ | ⋮ | ⋮ | ⋮ | ⋮ | ⋮ | ⋮ | ⋮ | ⋮ | ⋮ |
| | | | ⋮ | ⋮ | ⋮ | ⋮ | ⋮ | ⋮ | ⋮ | ⋮ | ⋮ | ⋮ | ⋮ | ⋮ | ⋮ |
| | | 75-80 | 0 | LINE | ⋮ | ⋮ | ⋮ | ⋮ | ⋮ | ⋮ | ⋮ | ⋮ | ⋮ | ⋮ | ⋮ |
| | | | 1 | DOT | ⋮ | ⋮ | ⋮ | ⋮ | ⋮ | ⋮ | ⋮ | ⋮ | ⋮ | ⋮ | ⋮ |
| | | | 2 | ERROR DIFFUSION | ⋮ | ⋮ | ⋮ | ⋮ | ⋮ | ⋮ | ⋮ | ⋮ | ⋮ | ⋮ | ⋮ |
| | | | ⋮ | ⋮ | ⋮ | ⋮ | ⋮ | ⋮ | ⋮ | ⋮ | ⋮ | ⋮ | ⋮ | ⋮ | ⋮ |
| | | 81-105 | 2 | ⋮ | ⋮ | ⋮ | ⋮ | ⋮ | ⋮ | ⋮ | ⋮ | ⋮ | ⋮ | ⋮ | ⋮ |
| | | 106-135 | 3 | ⋮ | ⋮ | ⋮ | ⋮ | ⋮ | ⋮ | ⋮ | ⋮ | ⋮ | ⋮ | ⋮ | ⋮ |
| | | 136-162 | 4 | ⋮ | ⋮ | ⋮ | ⋮ | ⋮ | ⋮ | ⋮ | ⋮ | ⋮ | ⋮ | ⋮ | ⋮ |
| | | ⋮ | ⋮ | ⋮ | ⋮ | ⋮ | ⋮ | ⋮ | ⋮ | ⋮ | ⋮ | ⋮ | ⋮ | ⋮ | ⋮ |
| 1 | PLAIN PAPER | | | | | | ⋮ | ⋮ | ⋮ | ⋮ | ⋮ | ⋮ | ⋮ | ⋮ | ⋮ |
| 2 | COLOR PAPER | | | | | | ⋮ | ⋮ | ⋮ | ⋮ | ⋮ | ⋮ | ⋮ | ⋮ | ⋮ |
| 3 | COATED PAPER | | | | | | ⋮ | ⋮ | ⋮ | ⋮ | ⋮ | ⋮ | ⋮ | ⋮ | ⋮ |

IMAGE QUALITY ADJUSTMENT

PLEASE SET IMAGE QUALITY

| COPYING DENSITY | NORMAL | RED COLOR | NORMAL | COLOR PHASE | NORMAL |
|---|---|---|---|---|---|
| BACKGROUND ADJUSTMENT | NORMAL | GREEN COLOR | NORMAL | COLOR SATURATION | NORMAL |
| REAR SIDE INK ERROR PREVENTION | NORMAL | BLUE COLOR | NORMAL | COLOR BRIGHTNESS | NORMAL |

| SHARPNESS | NORMAL |
| CONTRAST | NORMAL |
| IMAGE DISCRIMINATION ADJUSTMENT | CHARACTER/PICTURE NORMAL COLOR CHARACTER NORMAL |
| SCREEN SELECTION | AUTOMATIC |

COLOR BALANCE

HIGH DENSITY
NORMAL DENSITY
LOW DENSITY

| | CYAN | MAGENTA | YELLOW | BLACK |
|---|---|---|---|---|
| | +0 | +0 | +0 | +0 |
| | +0 | +0 | +0 | +0 |
| | +0 | +0 | +0 | +0 |

GLOSSY MODE

RETURN TO NORMAL | CLOSE

G4

B21

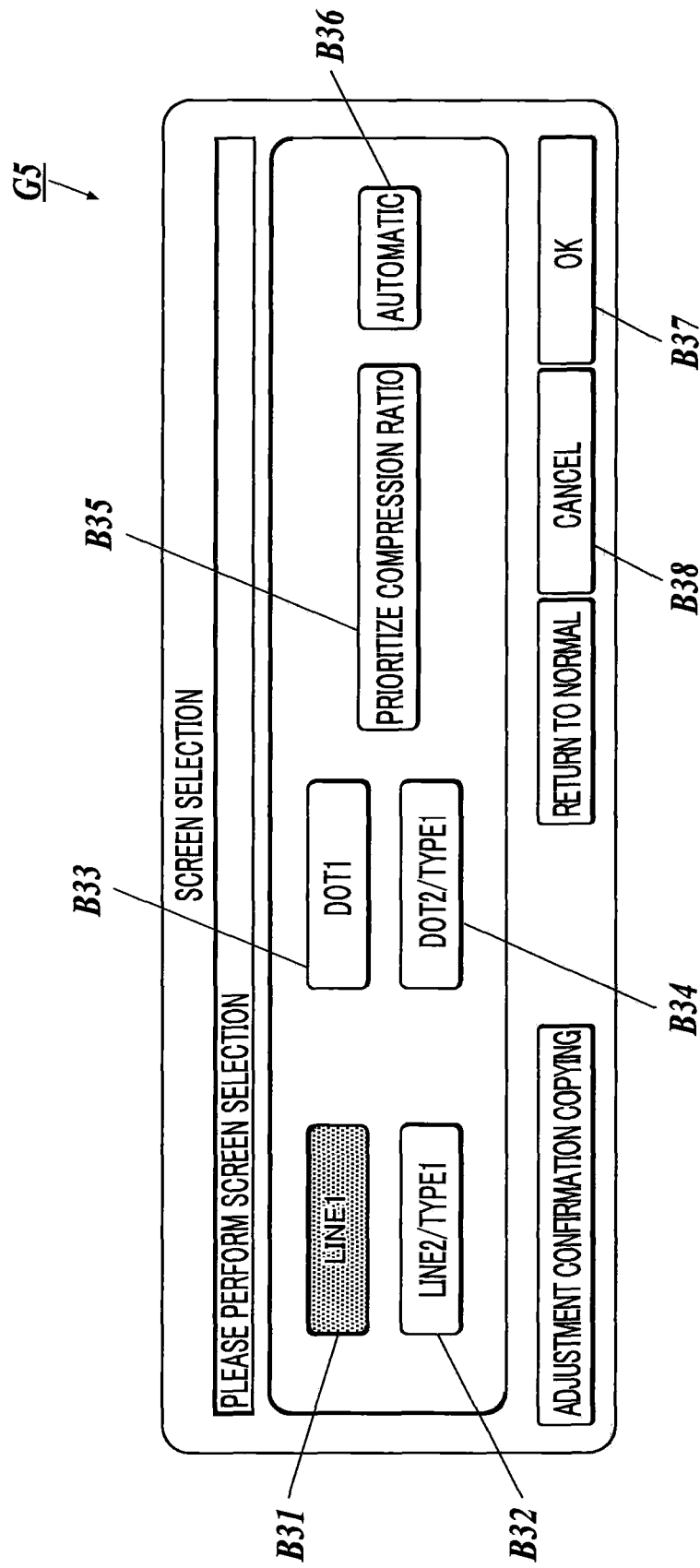

IMAGE FORMING APPARATUS AND DENSITY UNEVENNESS CORRECTION METHOD THEREIN

BACKGROUND

1. Field of the Invention

The present invention relates to an image forming apparatus and a density unevenness correction method in the image forming apparatus.

2. Description of Related Art

Lately, since density unevenness occur on an output image, an image forming apparatus such as a multi-functional peripheral, printer etc., includes a density adjustment function. It is known that such density unevenness occur from change in output density due to mechanical factors such as change of condition of the image forming apparatus over time, mounting position of the optical writing device such as a laser unit, etc., optical path length, distortion of lens, charging condition of drum, condition of intermediate transfer section or the like, or change in surrounding environment.

As an image forming apparatus including the density adjustment function, for example, according to Japanese Patent Application Laid-Open Publication No. 2005-246646 there is provided an image forming apparatus which stores image data with a color pattern where a color patch of a predetermined color and a color patch of colors in which a predetermined value is shifted with respect to each color component from a predetermined color are positioned so that the change of color phase is substantially continuous, and the image forming apparatus also stores identification information corresponding with the color patch. Then, the image forming apparatus outputs the color pattern based on the image data of the color pattern and performs color correction of the image data using the color correction table according to the input identification information.

However, it is known that density unevenness changes according to image forming conditions such as number of screen lines of the image formed, paper type and basis weight of the paper on which the image is formed, speed of lines which change due to the above factors, etc. Especially, there are various paper types and basis weight of paper, and various combinations are used by the user. Therefore, it is difficult to previously set the correction value according to the various image forming conditions, and there is a problem that density unevenness due to image forming conditions cannot be corrected.

SUMMARY

The present invention has been made in consideration of the above problems, and it is one of main objects to reduce density unevenness due to image forming condition and to equalize image density.

In order to achieve at least one of the above-described objects, according to an aspect of the present invention, there is provided an image forming apparatus including:

an image forming section to form an image on paper based on image data according to an image forming condition to output the image on the paper;

a storage section to store a plurality of correction values corresponding to setting conditions of the image forming condition, the correction values used for correction of density unevenness in a main scanning direction of the image;

a density correction section to perform correction of density of each pixel of the image data based on the correction value; and a control section to read out the correction value according to a set condition in the image forming condition from the storage section and to allow the density correction section to perform the correction of the density of each pixel of the image data based on the read out correction value.

According to another aspect of the present invention, there is provided a density unevenness correction method in an image forming apparatus to form an image on paper based on image data according to an image forming condition to output the image on the paper, the method including:

storing in advance a plurality of correction values corresponding to setting conditions of the image forming condition in a storage section, the correction values used for correction of density unevenness in a main scanning direction of the image;

receiving setting of the image forming condition;

reading out the correction value according to a set image forming condition from the storage section to allow the density correction section to perform the correction of the density of each pixel of the image data based on the read out correction value;

outputting an image based on the corrected image data on the paper according to the set image forming condition.

BRIEF DESCRIPTION OF THE DRAWINGS

The present invention will become more fully understood from the detailed description given hereinbelow and the appended drawings, and thus are not intended to define the limits of the present invention, and wherein;

FIG. 4 is a diagram showing an example of a density unevenness correction table;

FIG. 11 is a diagram showing an example of a density unevenness correction setting screen;

FIG. 14 is a diagram showing an example of an image quality adjustment screen;

FIG. 15 is a diagram showing an example of a screen selection screen; and

DETAILED DESCRIPTION OF PREFERRED EMBODIMENTS

A preferred embodiment reflecting an aspect of the present invention is described in detail with reference to the drawings. However, the scope of the invention is not limited to the illustrated examples.

First, the configuration is described.

Figure 1:
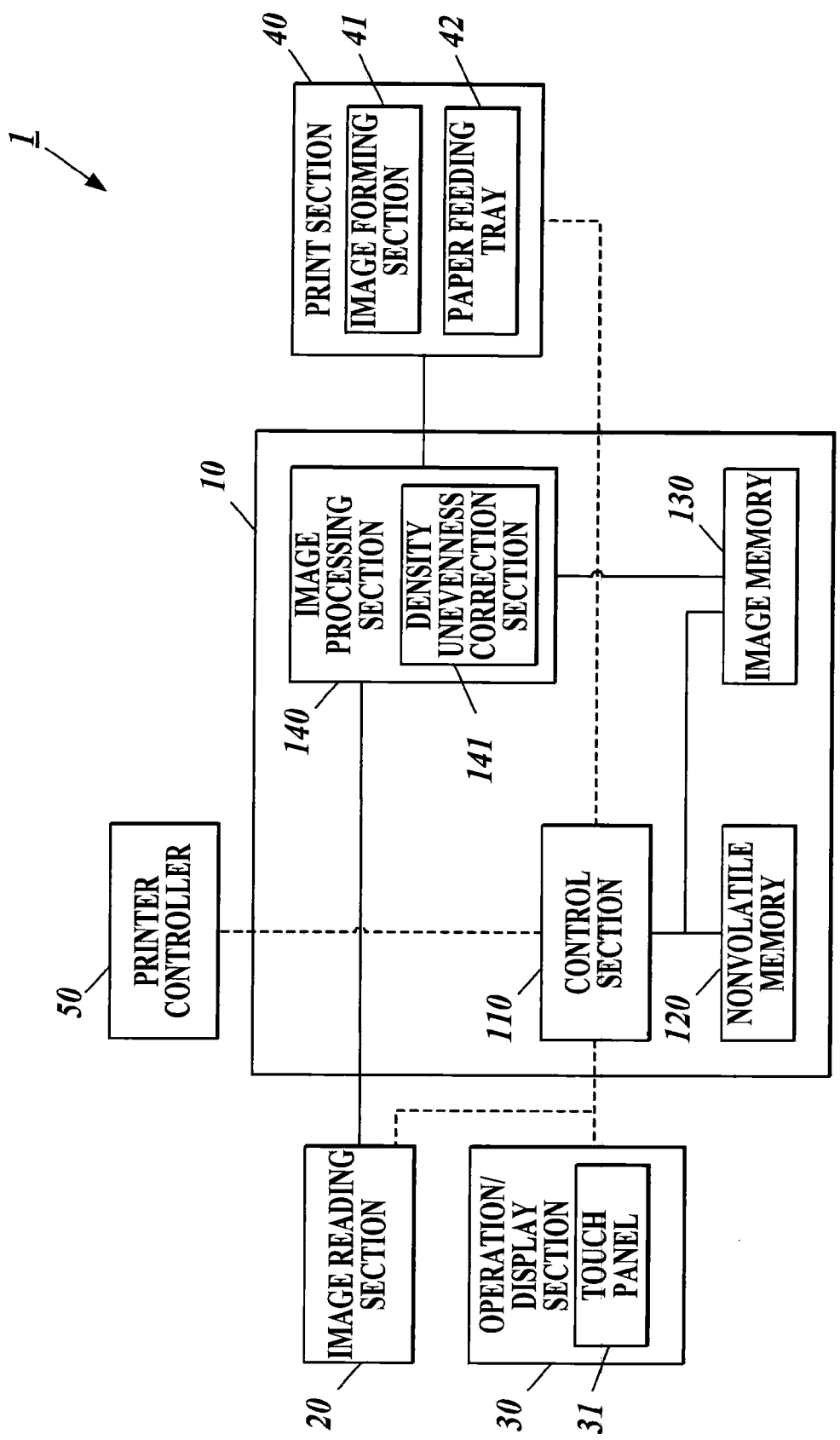
FIG. 1 is a diagram showing a functional configuration of the image forming apparatus.

FIG. 1 shows a diagram of a functional configuration of the image forming apparatus 1 of the present embodiment.

The image forming apparatus 1 of the present embodiment is an apparatus which forms an image on a sheet of paper and outputs the paper on which the color image is formed. The image is formed on the paper by reading an image from an original document and forming the read image, or by receiving page data including image data from an external device, etc. and job information including setting information such as image forming condition of each piece of image data, etc. and forming the image on the paper based on the received job information. Incidentally, the image forming apparatus 1 can be a digital multifunction peripheral including a finishing section to perform finishing processing on the paper with the image formed.

As shown in FIG. 1, the image forming apparatus 1 is configured including a main body control section 10, image reading section 20, operation/display section 30, print section 40, printer controller 50, etc.

The main body control section 10 includes a control section 110, nonvolatile memory 120, image memory 130, image processing section 140, and the like and each section is controlled by the control section 110.

The control section 110 includes a CPU (Central Processing Unit), ROM (Read Only Memory), RAM (Random Access Memory), and the like. The control section 110 reads out a specified program or piece of data from a system program, various application programs and various pieces of data stored in the ROM or the nonvolatile memory 120, and expands the program or data to the RAM, and in conjunction with the program expanded to the RAM, performs various processing and centrally controls each section of the image forming apparatus 1.

For example, the control section 110 performs control of switching between a copier mode, printer mode, and scanner mode, copying, printing, reading image data, and the like according to an instruction signal input from the operation/display section 30 or external device connected through the printer controller 50.

The control section 110 reads out a correction chart output processing program, density unevenness correction value setting processing program and image output processing program of the present embodiment and various necessary data from the ROM or the nonvolatile memory 120 and in conjunction with the program and the various data, controls the correction chart output processing, density unevenness correction value setting processing and image output processing.

In the correction chart output processing, image data including image data of an image for correction used for setting a density unevenness correction value with respect to each image forming condition and image data of image forming condition information image for showing the image forming condition is generated, and the generated image data is formed on the paper and a correction chart with respect to each image forming condition is output.

The image forming condition of the present embodiment is a condition concerning screen processing performed on the image data, type (paper type) and basis weight of paper on which the image based on the image data is formed, color used to form the image (hereinafter also referred to as output color), and the like, or any combination thereof. It is known that when the image forming condition differs, exposure image, fixing temperature, line speed, etc. changes, and the image formed on the paper changes.

The screen processing is processing to reproduce color of halftone and there is processing which uses line pattern, dot pattern or error diffusion processing.

The paper type is classified according to material of paper, absorbency and permeability of ink in the manufacturing process, diffusion and drying characteristic of ink droplets, etc. For example, there are paper types such as high quality paper, plain paper, color paper, coated paper, etc. The basis weight is the weight [$g/m^2$] of one sheet of paper for every one square meter of paper.

The colors for forming the image are to be yellow (Y), magenta (M), cyan (C) and black (K), however, the colors are not limited to these colors and can be a color formed by the later described image forming section included in the print section 40.

The image for correction includes a band image with a predetermined density and extending in a main scanning direction and an auxiliary line extending in a sub-scanning direction positioned in the correction reference position set in a unit of a predetermined number of pixels in the main scanning direction on the band image.

The image forming condition information image is an image showing identification information previously set with respect to each image forming condition. For example, the image forming condition information image is an identification number, barcode, or two dimensional code set with respect to each image forming condition. In the present embodiment, an identification number (hereinafter also referred to as image forming code) is used as the image forming condition information image.

Figure 2:
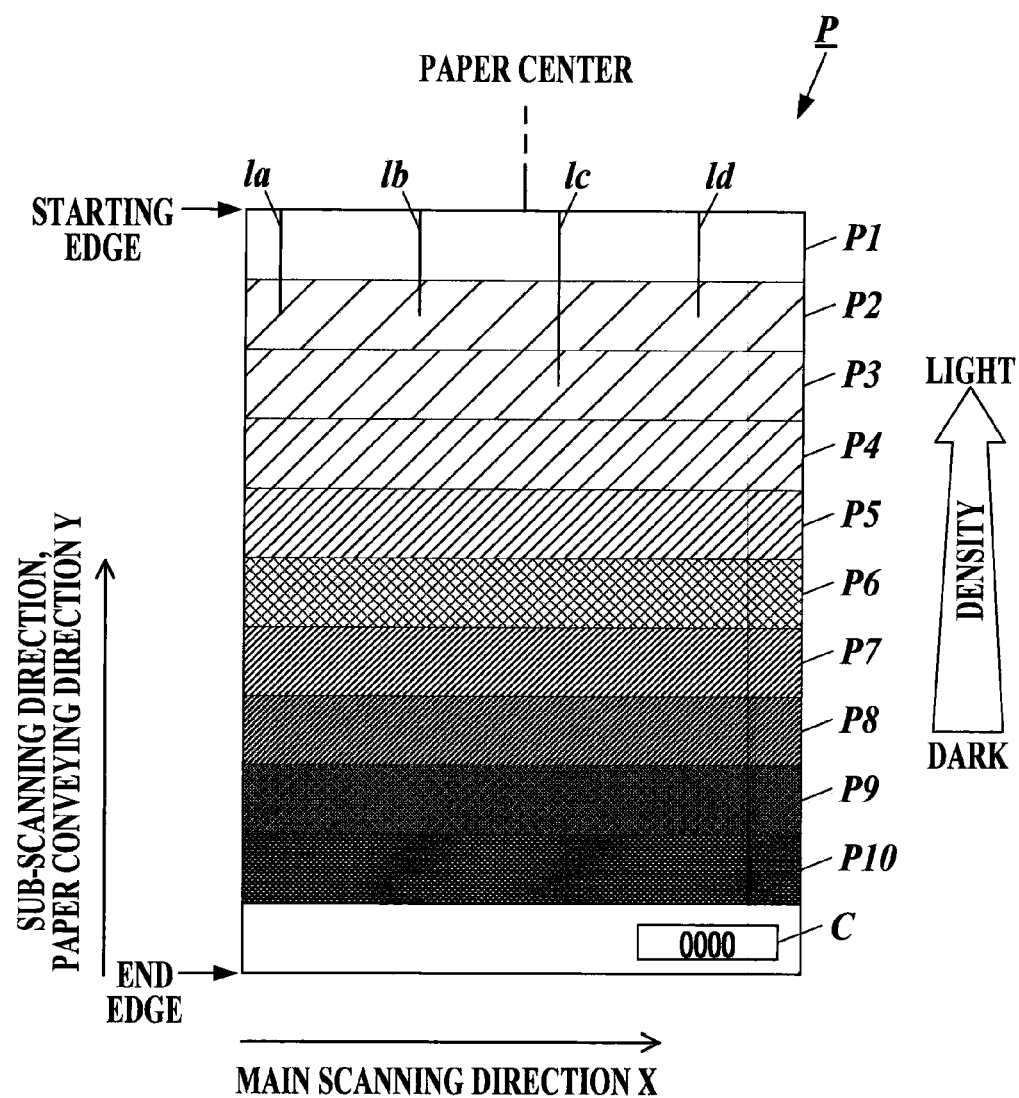
FIG. 2 is a diagram showing an example of a correction chart.

FIG. 2 is a diagram showing an example of a correction chart.

As shown in FIG. 2, the correction chart P is formed including a plurality of band images P1 to P10 on the paper, a plurality of auxiliary lines la to ld formed on the band image P1 to P10 and image forming code C.

The band images P1 to P10 are images with a previously set density extending in the main scanning direction X and with a density different from the band image adjacent in the sub-scanning direction Y, and are arranged so that the density of each band image becomes gradually darker or lighter in the paper conveying direction (sub-scanning direction Y) from a starting edge to an end edge.

The auxiliary lines la to ld are formed on a portion of the band images P1 to P10. As for the length of each auxiliary line, at least the length of one of the auxiliary lines is different from that of another auxiliary line. For example, in FIG. 2, the auxiliary lines la, lb, ld extend from the starting edge of the paper conveying section in the sub-scanning direction and is the length to the position of the band image P2 without extending to the end edge, whereas the auxiliary line lc is the length to the position of the band image P3 without extending to the end edge. It is preferable that the auxiliary line with a length different from the other auxiliary lines (in this case, auxiliary line lc), is set in the auxiliary line which is closest to the position of the center of the paper in the main scanning direction X. The present embodiment describes an example where the length of the auxiliary line lc which is closest to the position of the center of the paper is longer than that of the other auxiliary lines la, lb, ld, however, the present embodiment is not limited to this example.

Also, the density of the auxiliary lines la to ld is determined according to the density of the band image on which the auxiliary line is formed. For example, when the density of the band images P1, P2 on which the auxiliary line la is overlapped is lower (lighter) than the previously set density, then the density of the auxiliary line la is set to a density higher (darker) than the previously set density. When the density of the band image on which the auxiliary line la is overlapped is more than (darker) the previously set density, the density of the auxiliary line la is set to a density less than (lighter) than the previously set density.

Figure 3:
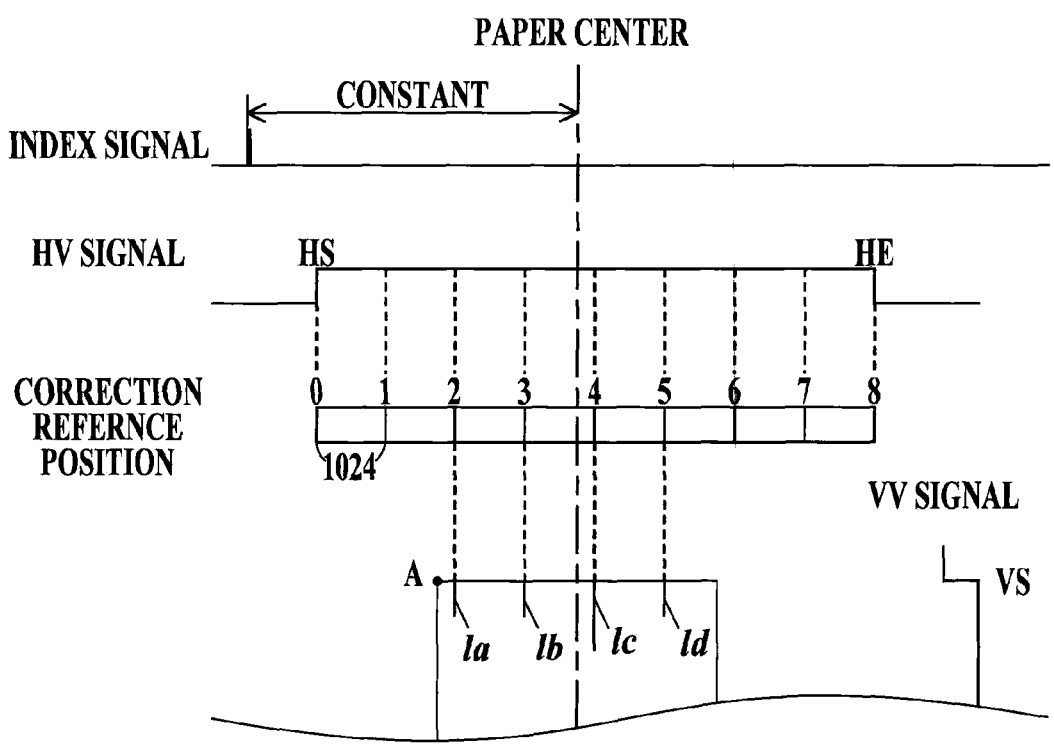
FIG. 3 is a diagram showing a relation between an auxiliary line and a correction reference position.

FIG. 3 is a diagram showing a relation between the auxiliary line and the correction reference position.

The main scanning writing reference signal (INDEX signal) is a timing signal generated when the laser of the exposure device scanning in the main scanning direction passes a sensor provided near a scanning starting position in the main scanning direction.

The main scanning valid writing signal (HV signal; Horizontal Valid signal) is generated based on the width in the main scanning direction of the paper Size and is a signal showing a valid area of one line in the main scanning direction from when the HV signal rises (High) (HS) to when the HV signal falls (Low)(HE).

The sub-scanning valid writing signal (VV signal; Vertical Valid signal) is a signal showing a valid area signal of an entire image area of the image data.

The correction reference position is a position dividing the length corresponding to the period from HS to HE of the HV signal in a unit of a previously set number of pixels (for example, 1024 pixels). Therefore, it is rare that any one of the correction reference positions matches the position of the center of the paper. However, a period of time from when the INDEX signal rises to when the pixel signal of the paper center position is output is constant, and also a period of time from when the INDEX signal rises to the HS of the HV signal is also constant. Therefore, since the period of time from the HS of the HV signal to when the pixel signal of the paper center position is output is also constant, the position of the auxiliary line corresponding to each correction reference position formed on the paper can be calculated based on the HV signal.

For example, when the paper center position is 4000 clocks, the HS is 100 clocks and the HE is 7900 clocks from the rise of the INDEX signal and the paper size is A4 size where the length in the main scanning direction is 210 mm, an example describes calculating the writing starting position A of the paper in 600 dpi and calculating the position of the correction reference position closest to the writing starting position A.

The number of clocks from the rise of the INDEX signal of the writing starting position A can be calculated by the following formula.

$$\text{Writing starting position } A = 4000 - (210 \times (600/25.4))/2$$
$$= 1520$$

The writing starting position A is 1520 clocks from the rise of the INDEX signal, in other words, 1420 clocks from the HS. Since the correction reference position is positioned at every 1024 clocks from the HS, an auxiliary line corresponding to the correction reference position with an identification number of 0 or 1 within the position of 1420 clocks from the HS is not formed and a position where 608 clocks (=1024×2−1420) is added to 1420 clocks from the HS is calculated as the position of the auxiliary line corresponding to the correction reference position where the identification number is 2. With this, the position of the auxiliary line on the paper corresponding to each correction reference position can be calculated.

Incidentally, the length in the sub-scanning direction Y, density and line width of each auxiliary line can be specifiable on the operation/display section 30.

In the density unevenness correction value setting processing, input of the correction value of the density of the pixel in the correction reference position is received by the operation/display section 30 based on the correction chart output with respect to each image forming condition and the input correction value of the pixel in the correction reference position with respect to each image forming condition is stored in the density unevenness correction table of the nonvolatile memory 120.

In the image output processing, when the image is formed on the paper based on the image data, the correction value according to the condition set in the image forming condition of the image data is read out by referring to the density unevenness correction table of the nonvolatile memory 120. Then, a density unevenness correction section 141 performs linear interpolation processing of pixel density with respect to each correction reference position based on the read out correction value and correction of the pixel density of the image to be formed is performed based on the result of the linear interpolation processing and the image is output.

The nonvolatile memory 120 stores various processing programs and data regarding image forming. The nonvolatile memory 120 also stores the correction chart output processing program, density unevenness correction value setting processing program and image output processing program of the present embodiment, various data such as tray information, density unevenness correction table, etc., data processed in various programs, and the like.

The tray information includes type (paper type), basis weight, size, etc. of paper stored in each paper feeding tray and is set on the operation/display section 30.

FIG. 4 is a diagram showing an example of a density unevenness correction table.

As shown in FIG. 4, in the density unevenness correction table, the correction values with respect to each one of the plurality of correction reference positions for correcting density unevenness in the main scanning direction of the image are set corresponding to each setting condition of the image forming condition. The correction values of the present embodiment are set for nine correction reference positions from 0 to 8 where the length corresponding to the period from the HS to the HE of the HV signal is divided in unit of a previously set number of pixels (for example, 1024 pixels).

When the correction value is not set, for example in a factory default setting or initial value setting, this correction value is set to "FF" which shows a correction value is not set.

Also, in each classification of each image forming condition (condition concerning paper type, basis weight, screen processing, output color, etc.) a serial number No. is assigned and the combination of these serial numbers No. is to be the image forming condition information image (image forming code) which shows each image forming condition.

In FIG. 4, the serial number No. of the paper type is set such as 0 for high quality paper, 1 for plain paper, 2 for color paper, 3 for coated paper, and the like. The serial number No. of the basis weight is set such as 0 for 64 to 74 [g/m$^2$], 1 for 75 to 80 [g/m$^2$], 2 for 81 to 105 [g/m$^2$], 3 for 106 to 135 [g/m$^2$], 4 for 136 to 162 [g/m$^2$], and the like. The serial number No. of screen processing is set such as 0 for the line pattern, 1 for the dot pattern, 2 for the error diffusion, and the like. The serial number No. of the output color is set such as 0 for Y, 1 for M, 2 for C, 3 for K, and the like.

For example, the image forming code is "0000" to show image forming conditions where paper type is high quality paper, basis weight is 64 to 74 [$g/m^2$], screen processing is performed with the line pattern, and the output color is Y. Also, the correction value of the image forming code "0000" is correction value group D.

The image memory 130 is composed of an HDD (Hard Disk Drive), DRAM (Dynamic RAM), etc., and stores image data to be readable and writable. According to an instruction from the control section 110, the image memory 130 stores and saves image data input from the image reading section 20 or the printer controller 50, and the image data stored in the image memory 130 is read out to be output to the image processing section 140.

The image processing section 140 performs various image processing such as screen processing, etc. on the image data input from the image reading section 20, printer controller 50 or image memory 130 and outputs the image data to the control section 110 or the image memory 130. The image processing section 140, for example, converts the analog image signal input from the image reading section 20 to digital image data, compresses digital image data to output to the image memory 130, and expands the compressed image data to output the data.

Also, the image processing section 140 generates an HV signal, VV signal and clock signal (CLK signal) and outputs the signals to the control section 110. For example, the CLK signal is generated by a crystal oscillator, etc. provided (on a substrate included) in the image processing section 140.

Further, the image processing section 140 includes a density unevenness correction section 141.

The density unevenness correction section 141 functions as a density correction section by performing linear interpolation with respect to each space between the correction reference positions based on the correction value with respect to each correction reference position input from the control section 110 and correcting the density of each pixel of each color of the image forming section 41 in the main scanning direction based on the result of the linear interpolation with respect to each space between the correction reference positions.

Figure 5:
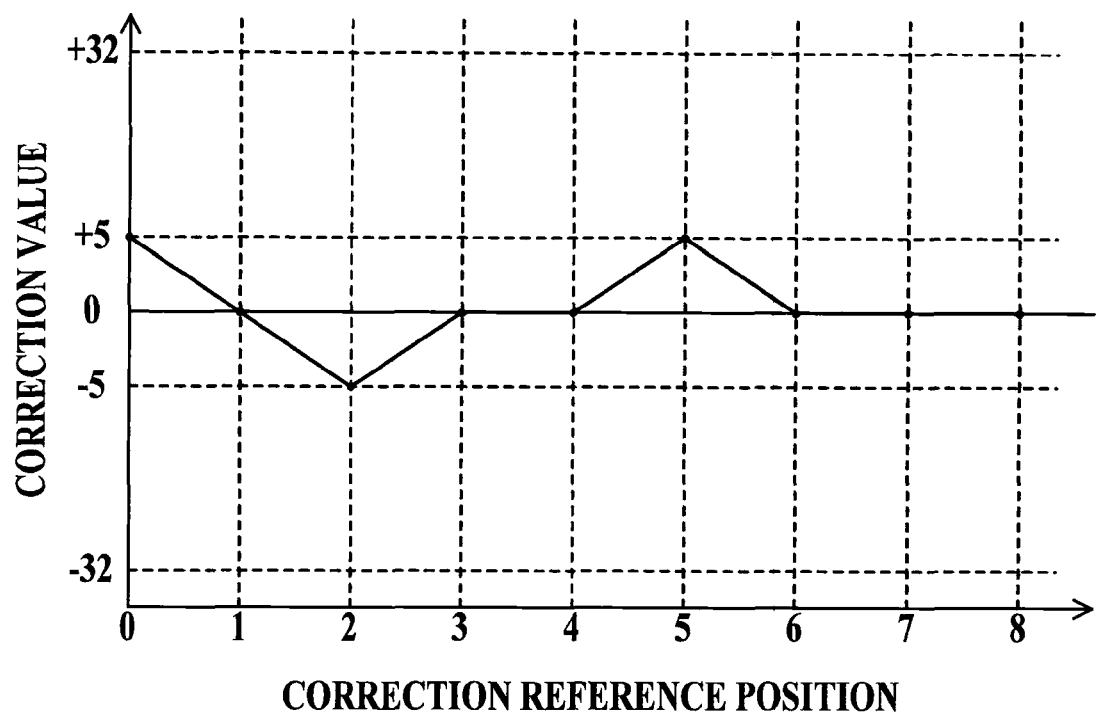
FIG. 5 is a diagram explaining the correction processing performed in the density unevenness correction section.

FIG. 5 is a diagram explaining the correction processing performed in the density unevenness correction section 141.

In the graph shown in FIG. 5, the horizontal axis shows the number to identify each correction reference position (number to identify auxiliary line) and the vertical axis shows the correction value.

A correction value input on the operation/display section 30 is set for each correction reference position and linear interpolation is performed with respect to each space between the correction reference positions. As a result of the linear interpolation of each space between the correction reference positions, the correction value for each pixel in the space between the correction reference positions is calculated based on for example, the interpolation coefficient and the density of each pixel is corrected based on the correction value of each pixel.

For example, the correction value of each pixel of 1024 pixels in the space between the correction reference position of 2 and the correction reference position of 3 is calculated and set based on the interpolation coefficient of the linear interpolation based on the correction value (−5) of the correction reference position of 2 and the correction value (0) of the correction reference position of 3.

The image reading section 20 is composed of a CCD, image reading control section, automatic document feeding section called ADF (Auto Document Feeder), reading section, and the like. The image reading control section controls the automatic document feeding section, reading section, etc. based on an instruction from the control section 110 and reads images of a plurality of original documents. The read analog image signal is output to the image processing section 140. Here, an image is not limited to image data such as graphics, pictures, etc., and includes text data and the like, such as characters, symbols, etc.

The image data (analog image signal) read by the image reading section 20 is output to the image processing section 140 and after A/D conversion and various image processing is performed in the image processing section 140, the image data is output to the print section 40.

The operation/display section 30 is composed of an LCD (Liquid Crystal Display), a touch panel 31 provided so as to cover the LCD, start button, operation/display control section, and other components which are not shown such as operation keys, etc.

According to a display signal input from the control section 110, the operation/display control section of the operation/display section 30 displays on the LCD various setting screens to input various setting conditions, various screens as shown in FIG. 7 to FIG. 9, FIG. 11 and FIG. 13 to FIG. 16, and various processing results. Also, the operation/display section 30 outputs operation signals input from the operation key group or the touch panel 31 to the control section 110.

The print section 40 performs image forming processing of electro-photography based on the input print data and is composed of a print control section and sections regarding printed output such as a paper feeding section, paper conveying section, image forming section 41 of each color, fixing section, paper ejection section, etc.

The paper feeding section includes a plurality of paper feeding trays 42. Each paper feeding tray 42 stores paper identified in advance with respect to type of paper (paper type, basis weight, size) and conveys from the top sheet one sheet at a time to the paper conveying section.

The paper conveying section conveys the paper conveyed from the paper feeding tray 42 through the plurality of rollers such as intermediate roller, registration roller, etc. to the transferring device of the image forming section 41.

The image forming section 41 of each color includes a photoreceptor drum, charging device, exposure device, developing device, first transfer roller, cleaning device, etc. and forms an image of each color (Y, M, C, K) on the paper.

For example, light according to the image data of yellow (Y) is emitted from the exposure device onto the photoreceptor drum charged by the charging device and an electrostatic latent image is formed. Then, the developing device applies charged toner of yellow (Y) onto the surface of the photoreceptor drum on which the electrostatic latent image is formed and the electrostatic latent image is developed. The photoreceptor drum on which the toner is applied by the developing device is rotated at a certain speed to a transfer position positioned on the first transfer roller and the toner is transferred onto the intermediate transfer belt. After the toner is transferred onto the intermediate transfer belt, the cleaning device removes the residual charge, residual toner, etc. on the surface of the photoreceptor drum. The toner image transferred onto the paper is fixed by heat by the fixing device and paper formed with an image of the yellow (Y) toner fixed with heat is nipped through the paper ejection roller and ejected out of the paper ejection exit.

Similarly, the image forming section 41 of each color includes a charging device positioned within the vicinity of the photoreceptor drum, exposure device, developing device, first transfer roller and cleaning device, and each forms an image of magenta (M), cyan (C) and black (K).

The fixing device fixes the toner image transferred onto the paper with heat. The ejecting section ejects the paper on which the fixing processing is performed by nipping the paper with the paper ejection roller and ejecting the paper onto the paper ejection tray.

When the image forming apparatus 1 is used as a network printer, the printer controller 50 outputs to the image forming apparatus 1 data sent from an external device such as a PC (Personal Computer), etc., connected through a LAN (Local Area Network), etc.

Next, the operation of the present embodiment is described.

Figure 6:
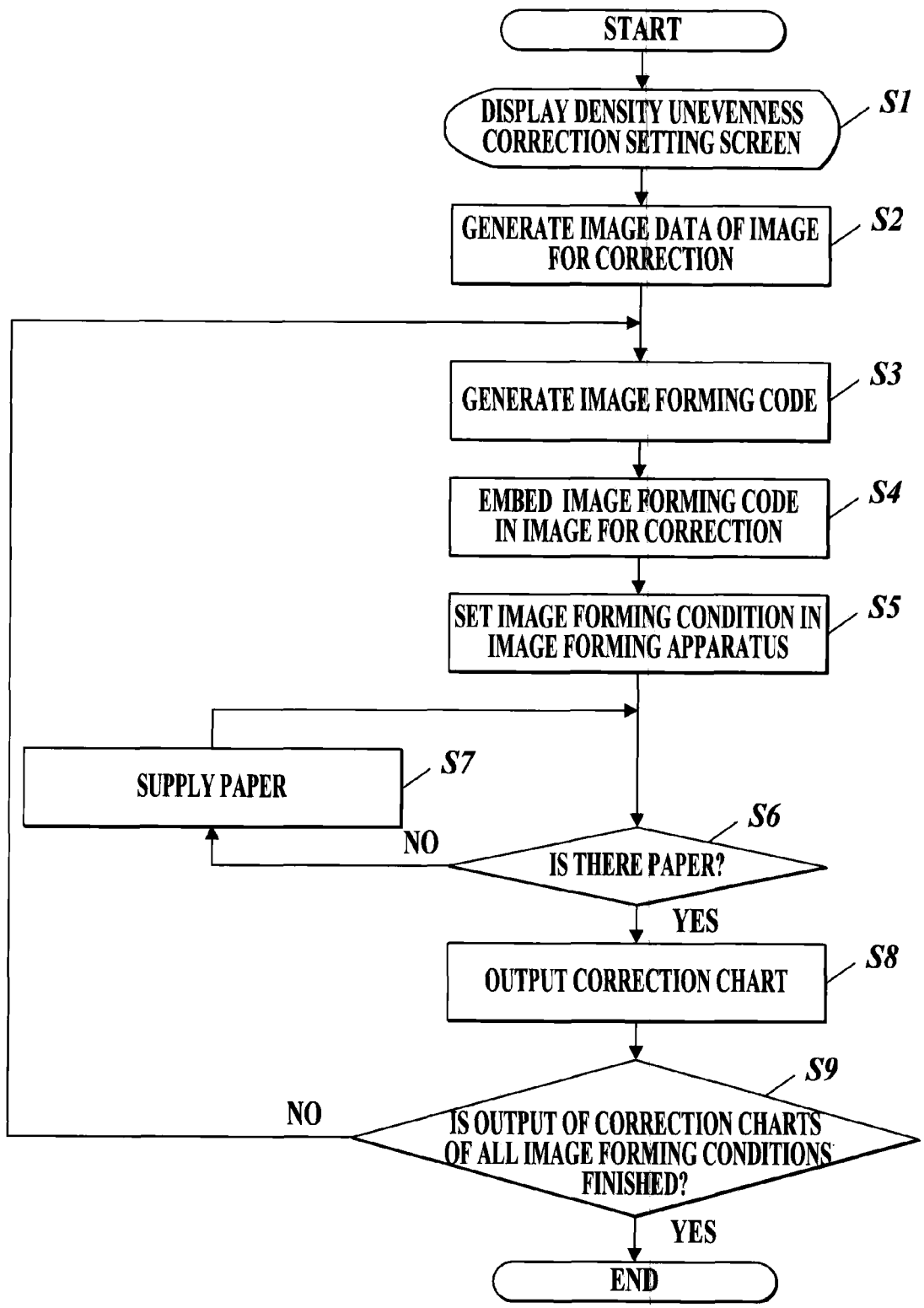
FIG. 6 is a flowchart showing correction chart output processing.

FIG. 6 is a diagram showing a flowchart of the correction chart output processing of the present embodiment. The processing is performed by the control section 110 in conjunction with each section.

First, according to an input instruction on the operation/display section 30, the control section 110 displays a machine status screen showing the machine status of the image forming apparatus 1 on the operation/display section 30.

Figure 7:
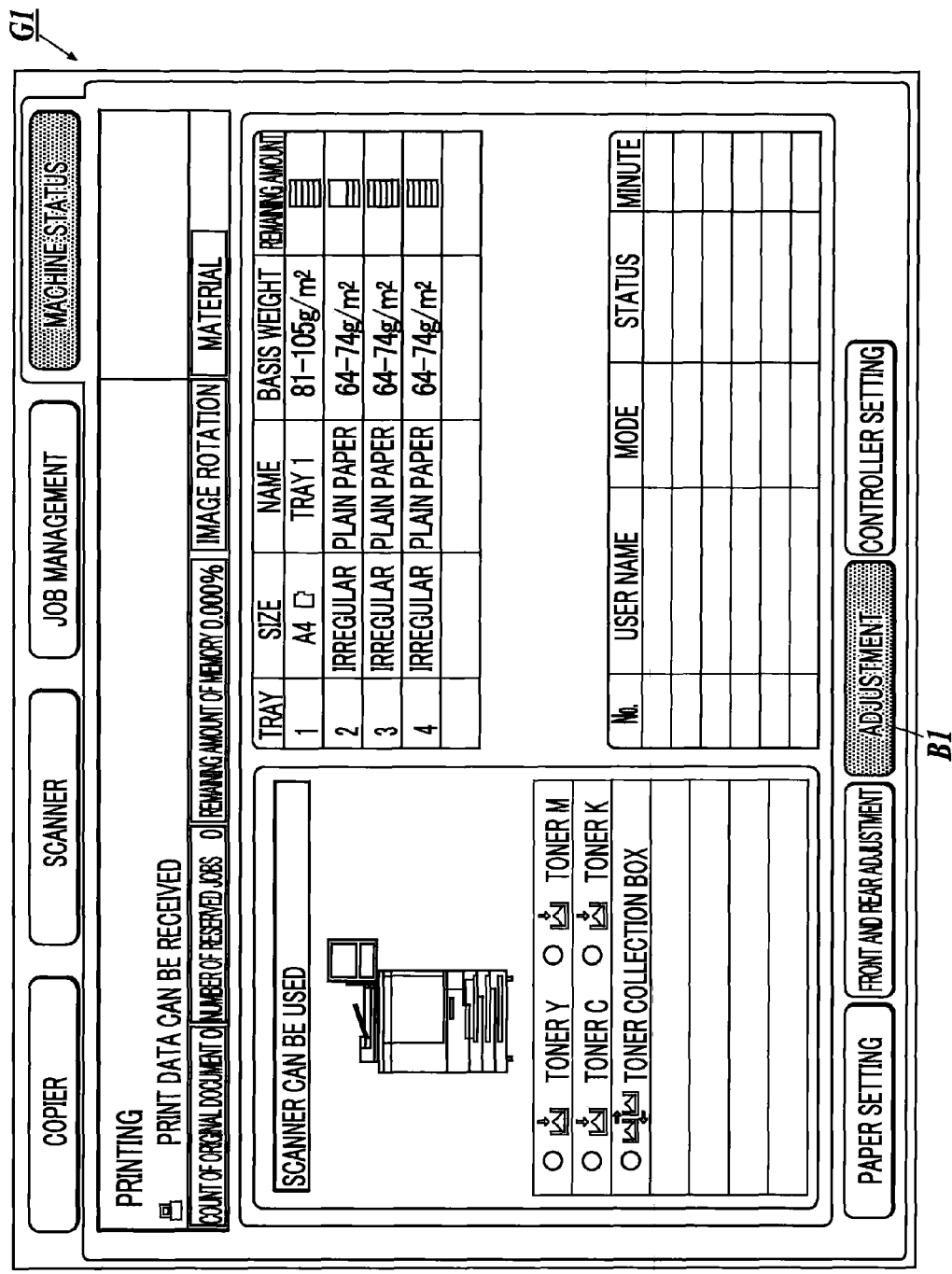
FIG. 7 is a diagram showing an example of a machine status screen.

FIG. 7 is an example of the machine status screen G1.

As shown in FIG. 7, the machine status screen G1 shows the status of the toner and the status of the paper stored in each paper feeding tray, and is provided with adjustment button B1 to display an adjustment screen to perform adjustment instruction of each section of the image forming apparatus 1.

Figure 8:
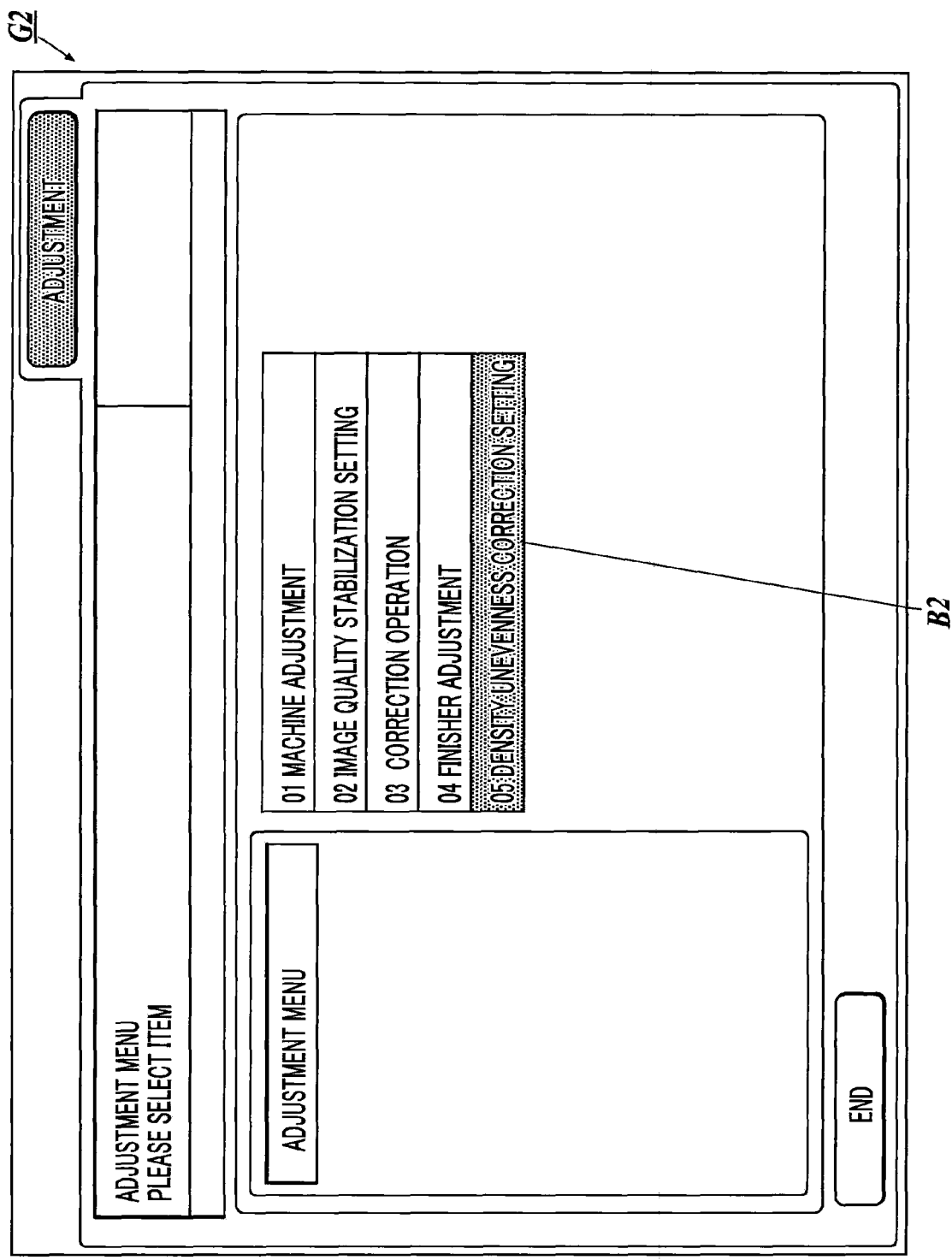
FIG. 8 is a diagram showing an example of an adjustment screen.

When the adjustment button B1 is depressed, the control section 110 displays an adjustment screen on the operation/display section 30. FIG. 8 shows an example of the adjustment screen G2.

As shown in FIG. 8, the adjustment screen G2 is provided with a density unevenness correction setting button B2 to display a density unevenness correction setting screen and a button to display a screen to perform other setting.

When the density unevenness correction setting button B2 is depressed, the control section 110 displays the density unevenness correction setting screen on the operation/display section 30 (step S1).

Figure 9:
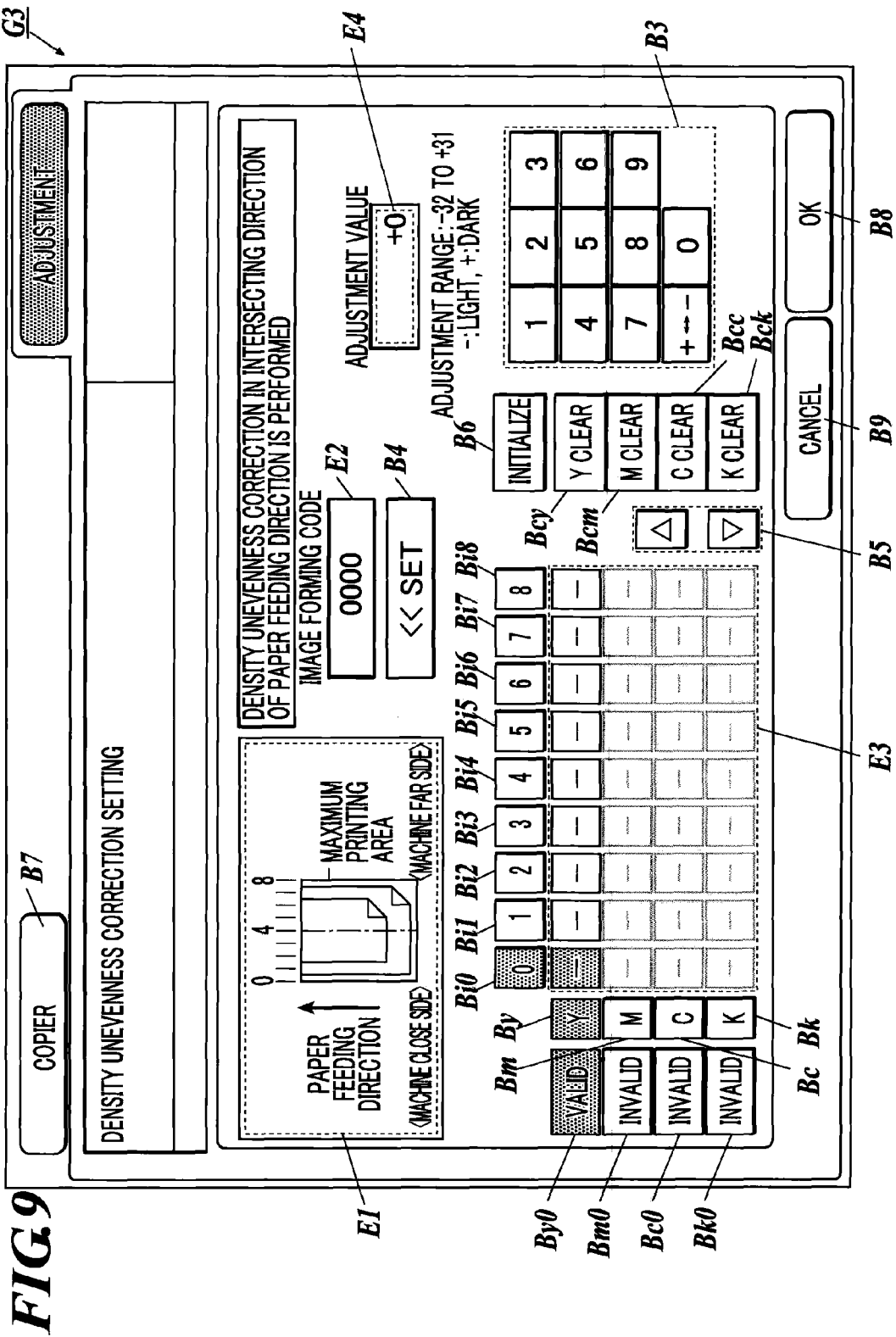
FIG. 9 is a diagram showing an example of a density unevenness correction setting screen.

FIG. 9 is a diagram showing an example of the density unevenness correction setting screen G3.

As shown in FIG. 9, the density unevenness correction setting screen G3 is provided with a paper image area E1, image forming code display area E2, correction value display area E3, display area E4, correction reference position buttons Bi0 to Bi8, toner color buttons By, Bm, Bc, Bk, numeric keys B3 including + and −, set button B4, increase/decrease button B5, initialize button B6, clear buttons Bcy, Bcm, Bcc, Bck, invalid buttons By0, Bm0, Bc0, Bk0, copier button B7, OK button B8 and cancel button B9.

The paper image area E1 displays a conceptual diagram showing a relation of position of the correction reference position and the correction chart.

The image forming code display area E2 displays the image forming code (the combination of the serial numbers showing the image forming condition information) input with the numeric keys B3 after the image forming code display area E2 is depressed.

The correction value display area E3 displays the correction value corresponding to each toner color button and each correction reference position button. Incidentally, the correction value set to "FF" is displayed "--". The density unevenness correction setting screen shown in FIG. 9 shows an example where all of the correction values are "FF".

The display area E4 displays a correction value specified by the numeric keys B3 as a correction value corresponding to the selected toner color button and correction reference position button.

The correction reference position buttons Bi0 to Bi8 receive selection instructions of each correction reference position.

The toner color buttons By, Bm, Bc, Bk receive selection instruction of the toner color.

As for the set button B4, when the set button B4 is depressed, the correction value displayed in the display area E4 is reflected on the correction value corresponding to the selected toner color button and the correction reference position button.

The increase/decrease button B5 increases or decreases the value of the correction value corresponding to the selected toner color button and correction reference position button.

The initialize button B6 sets all of the correction values displayed on the correction value display area E3 to initialized "FF".

The clear buttons Bcy, Bcm, Bcc, Bck return the correction value of the toner color to the initial value.

The invalid buttons By0, Bm0, Bc0, Bk0 changes the correction value set in the toner color button to invalid correction value (=0) which obtains the same result as when the correction function of the density unevenness correction processing is disabled.

The copier button B7 displays the copying setting button.

When the start button is depressed with the density unevenness correction setting screen G3 displayed, the correction section 110 generates the image data of the image for correction (step S2).

The correction section 110 refers to the serial number of the image forming condition of the density unevenness correction table and generates the image forming code (step S3). Then, the control section embeds the image data of the image forming code in the image data of the image for correction (step S4) and sets the image forming condition shown in the image forming code in each section of the image forming apparatus 1 (step S5).

The control section 110 refers to the tray information and specifies the paper feeding tray which stores the paper with the paper type and basis weight shown in the image forming code and determines whether or not there is paper in the specified paper feeding tray (step S6).

When there is no paper (step S6; NO), the control section 110 displays a message screen showing the paper feeding tray needs to be supplied with paper on the operation/display section 30 (step S7) and the processing returns to step S6.

When there is paper (step S6; YES), the control section 110 performs the setting processing of the density unevenness correction section 141, allows the image processing section 140 to perform image processing of the image data where the image forming code generated in step S4 is embedded in the image for correction and allows the print section 40 to output the correction chart (step S8).

The setting of the density unevenness correction section 141 is, for example, to perform linear interpolation in the space between the correction reference positions based on the correction value of each correction reference position of the image forming condition corresponding to the combination of the serial number shown by the image forming code generated in step 3, and to calculate the density value of each pixel according to the result of the linear interpolation.

The control section 110 judges whether or not the output of the correction chart of all image forming conditions are finished (step S9).

When the output of the correction chart of all image forming conditions are not finished (step S9; NO), the control section 110 returns the processing to step S3. When the output of the correction chart of all image forming conditions are finished (step S9; YES), the control section 110 ends the correction chart output processing.

Figure 10:
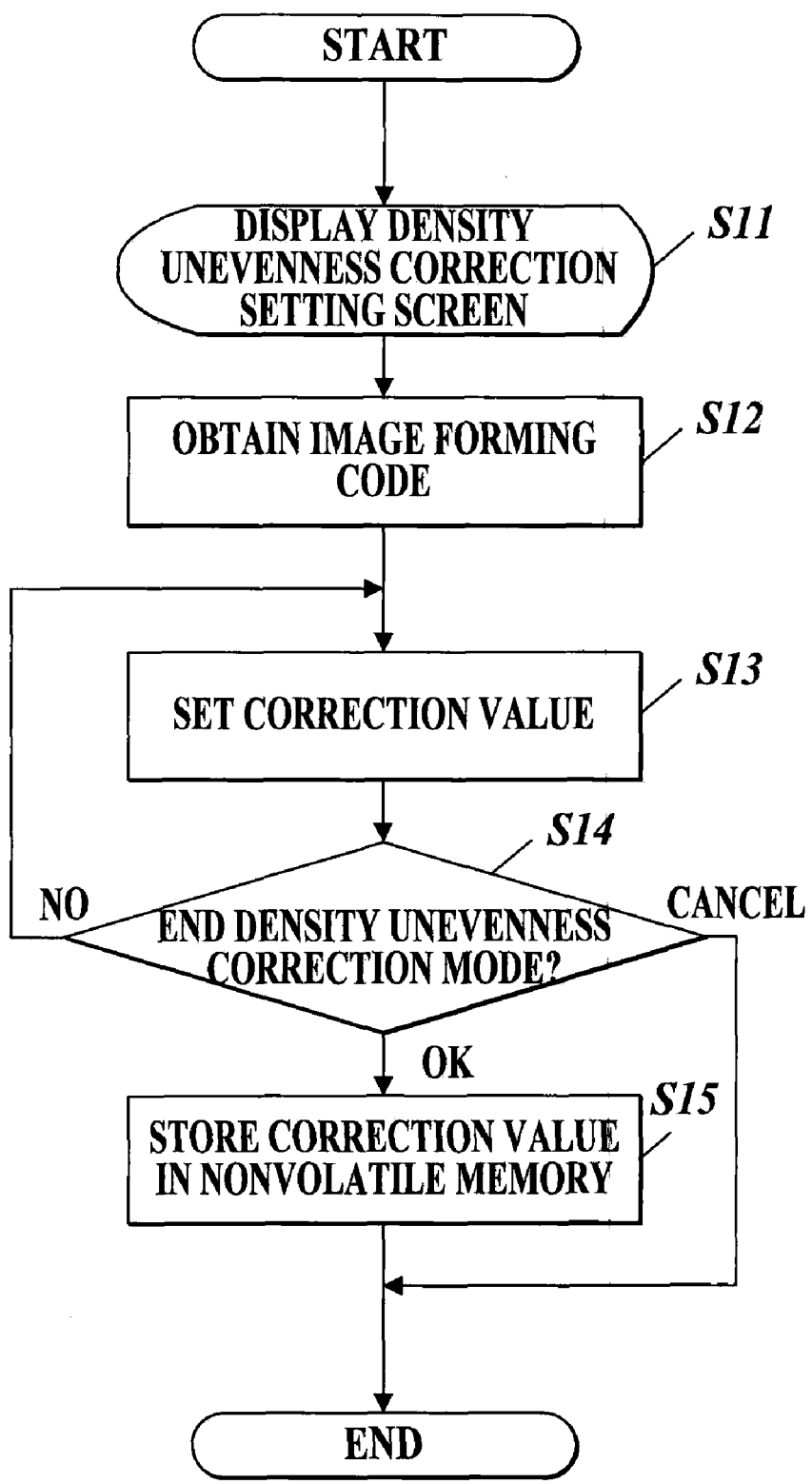
FIG. 10 is a flowchart showing density unevenness correction value setting processing.

FIG. 10 is a diagram showing a flowchart of the density unevenness correction value setting processing of the present embodiment. This processing is performed by the control section 110 in conjunction with each section.

According to an input instruction from the operation/display section 30, the control section 110 displays the density unevenness correction setting screen G3 on the operation/display section 30 (step S11).

Figure 11:
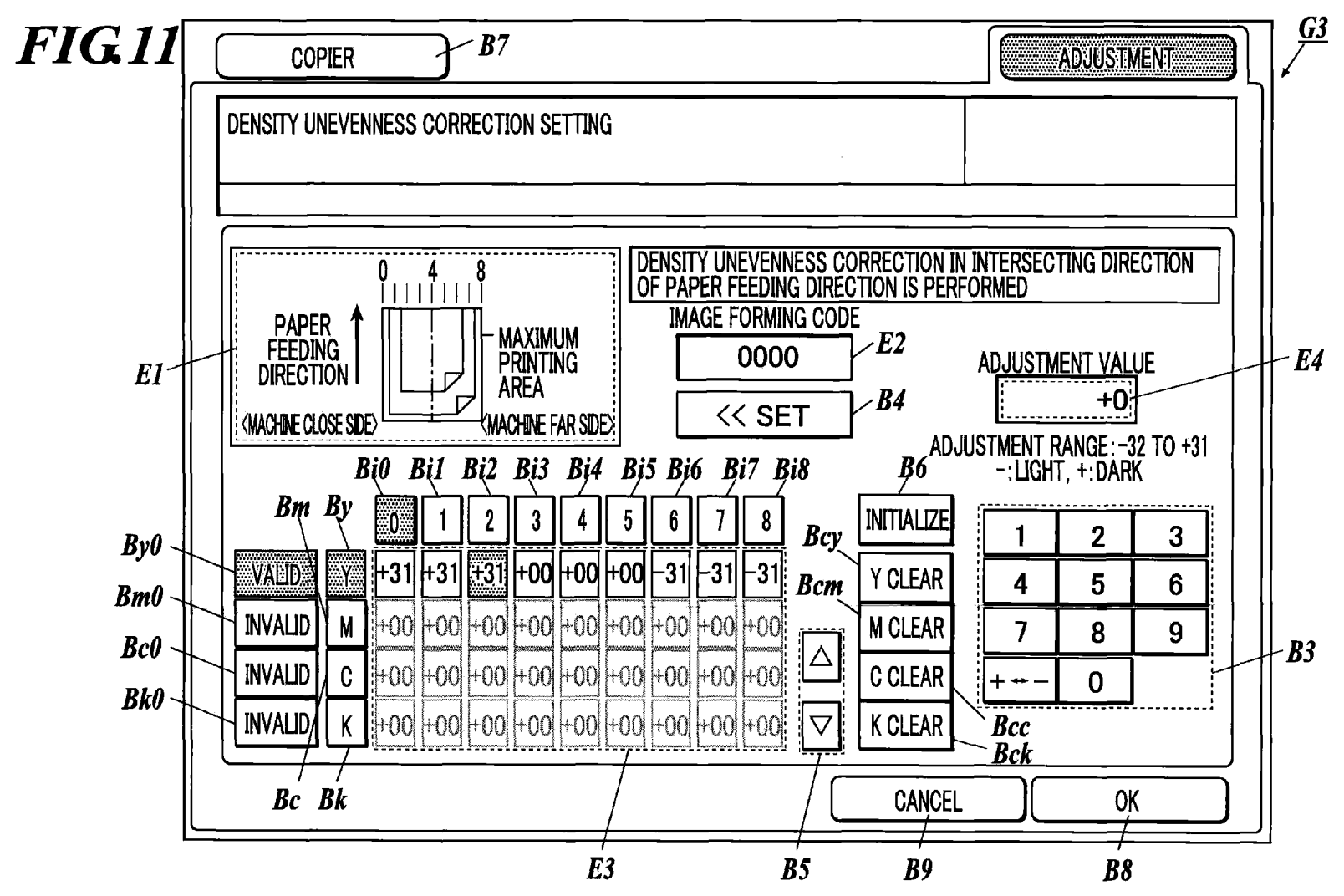

FIG. 11 is a diagram showing an example of a density unevenness correction setting screen G3.

The density unevenness correction setting screen G3 shown in FIG. 11 has the same layout as the density unevenness correction setting screen G3 shown in FIG. 9, and thus the same reference numerals are applied and the description is omitted.

Incidentally, a value read out as the correction value of the image forming condition specified in the density unevenness correction table is displayed in the correction value display area E3 of the density unevenness correction setting screen G3 shown in FIG. 11.

When the image forming code display area E2 is depressed and the image forming code is input with the numeric keys B3, the control section 110 obtains the input image forming code (step S12).

Then, the control section 110 refers to the density unevenness correction table, retrieves the image forming condition corresponding to the combination of the serial number shown in the obtained image forming code and reads out the correction value corresponding to the retrieved image forming condition. The control section 110 displays the read out correction value on the correction value display area E3.

The control section 110 receives input of the correction value of the image forming condition specified on the density unevenness correction setting screen G3, performs setting of the correction value according to the input of the correction value (step S13) and stores the correction value (hereinafter referred to as setting correction value) set in the density unevenness correction setting screen G3 in the RAM in the control section 110.

In step S13, for example, the control section 110 sets the correction value of the toner color and the correction reference position matching the two buttons which are depressed by the user from any one of the toner color buttons By, Bm, Bc, Bk and any one of the correction reference position buttons Bi0 to Bi8 as the value displayed in the display area E4 when the set button B4 is depressed after the correction value is adjusted by the numeric keys B3 or increase/decrease button B5.

Also, when the initialize button B6 is depressed, the control section 110 sets all of the correction values displayed in the correction value display area E3 to "FF" and initializes the value.

When the clear buttons Bcy, Bcm, Bcc, Bck are depressed, the control section 110 returns the correction value of the toner color corresponding to the depressed clear button to the initial value.

When the invalid buttons By0, Bm0, Bc0, Bk0 are depressed, the control section 110 sets the correction value of the toner color corresponding to the depressed invalid button to the invalid correction value (=0).

Therefore, the density unevenness correction setting screen G3 displayed on the operation/display section 30 functions as an input section to input the correction value to correct the density of the pixel with respect to each image forming condition based on the correction chart.

The control section 110 judges whether or not the density unevenness correction mode is finished (step S14). When the density unevenness correction mode of step S14 is finished, there are two cases, which is when the cancel button B9 is depressed or the OK button B8 is depressed. When the OK button B8 is depressed (step S14; OK), the control section 110 overwrites the density unevenness correction table of the nonvolatile memory 120 with the correction value stored in the RAM as the correction value of the read out image forming condition and stores the correction value (step S15). Then, the control section 110 ends the density unevenness correction value setting processing. When the cancel button B9 is depressed (step S14; CANCEL), the control section 110 ends the density unevenness correction value setting processing without performing step S15.

When the density unevenness correction mode is not finished, for example when a button provided on the density unevenness correction setting screen G3 other than the OK button B8 and cancel button B9 is depressed (step S14; NO), the correction section 110 performs the processing according to the depressed button and returns the processing to step S13.

Figure 12:
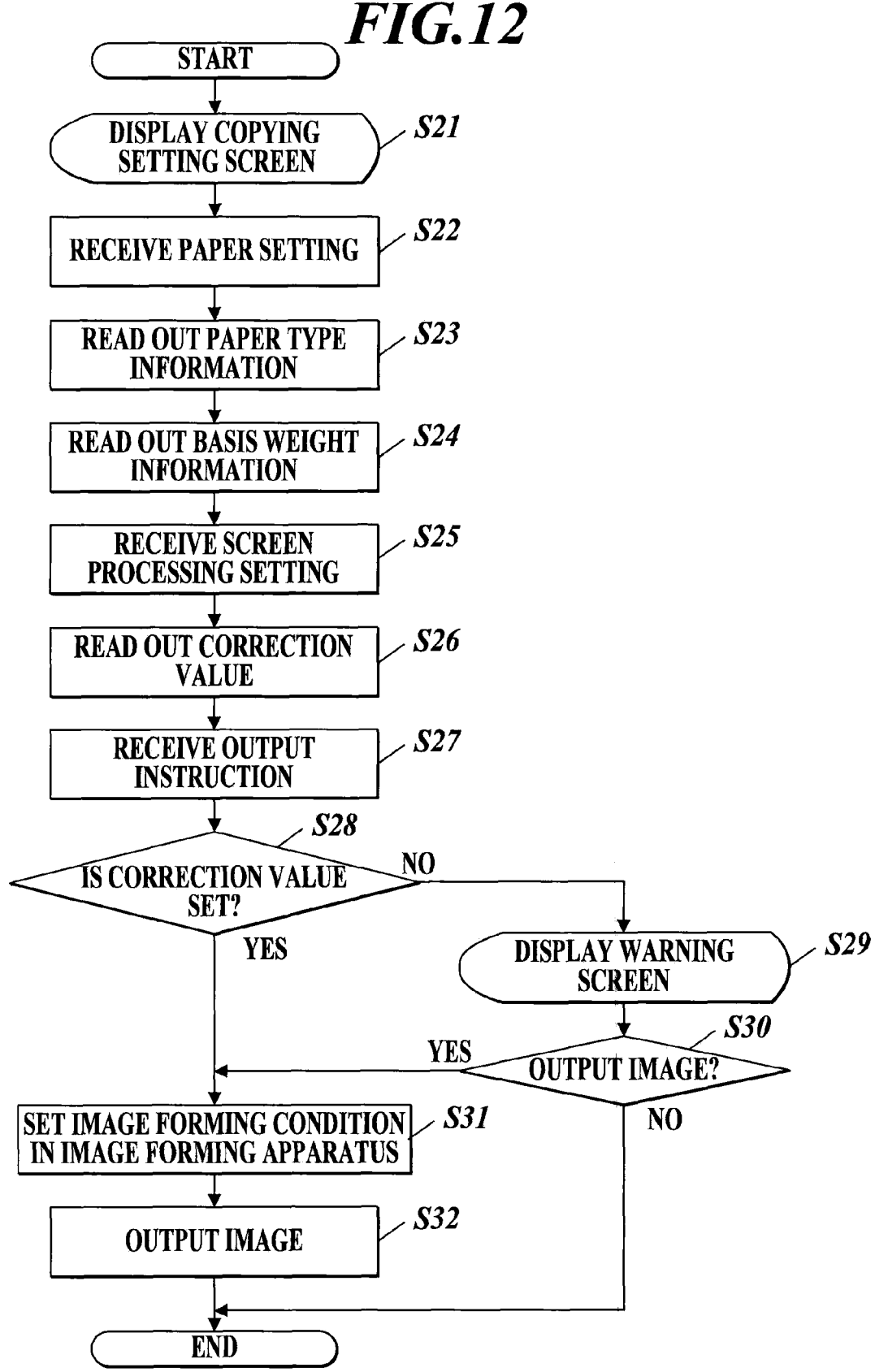
FIG. 12 is a flowchart showing image output processing.

FIG. 12 is a diagram showing a flow chart of the image output processing of the present embodiment. The processing is performed by the control section 110 in conjunction with each section.

According to an input instruction from the operation/display section 30, the control section 110 displays the copying setting screen G0 on the operation/display section 30 (step S21).

Figure 13:
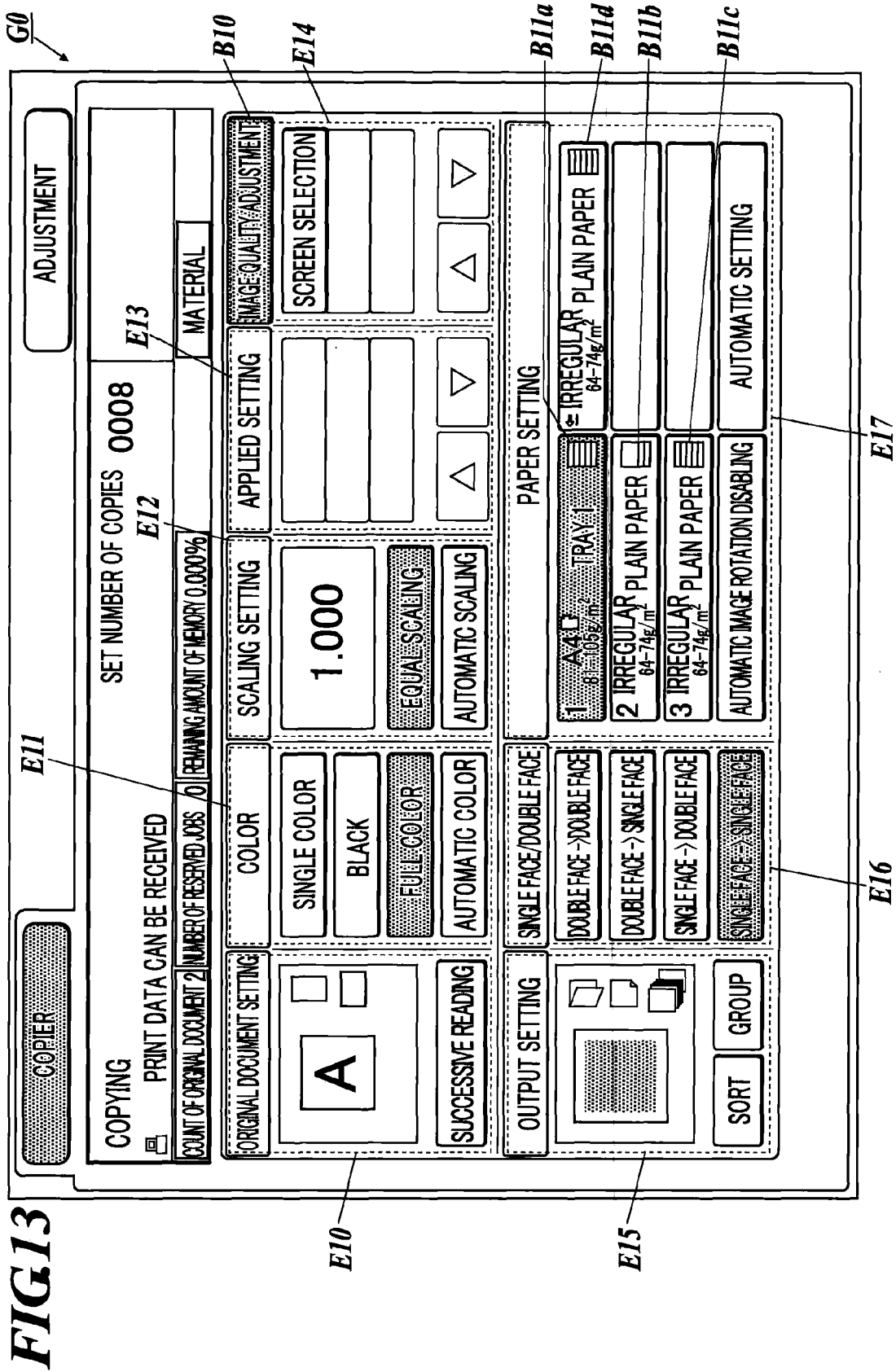
FIG. 13 is a diagram showing an example of a copying setting screen.

FIG. 13 is a diagram showing an example of the copying setting screen G0.

As shown in FIG. 13, the copying setting screen G0 is provided with an original document setting area E10, color setting area E11, scaling factor setting area E12, applied setting area E13, image quality adjustment area E14, output setting area E15, single face/double face setting area E16, and paper setting area E17. The copying setting screen G0 is a screen for performing setting of various output modes of the image formed, various setting of the paper on which the image is formed, and the like. Incidentally, the output mode is the operation of the output state such as output color (black, color, etc.), scaling, single face or double face, etc.

The image quality adjustment area E14 is provided with an image quality adjustment button B10 to display the image adjustment screen. Also, the paper setting area E17 is provided with paper feeding tray buttons B11a to B11d for setting the paper stored in each paper feeding tray and for receiving the selection instruction of the paper feeding tray to feed paper.

The control section 110 receives setting of various output modes of the image to be formed and the setting of the paper on which the image is formed on the copying setting screen G0 (step S22).

The setting of the paper in step S22 is performed by the user depressing any one of the paper feeding tray buttons B11a to B11d of the paper setting area E17 and setting the paper stored in the paper feeding tray corresponding to the depressed paper feeding tray button.

The control section 110 refers to the tray information, reads out the information of the paper type of the paper stored in the paper feeding tray storing the paper set in step S22 (step S23) and reads out the information of the basis weight (step S24). Also, the control section 110 receives the setting of the screen processing (step S25).

In the setting of the screen processing in step S25, first, when the user depresses the image quality adjustment button B10 of the image quality adjustment area E14, the control section 110 displays the image quality adjustment screen.

FIG. 14 is a diagram showing an example of the image quality adjustment screen G4.

As shown in FIG. 14, the image quality adjustment screen G4 is provided with various buttons such as screen selection button B21, etc. to make a transition to a screen for receiving instruction for adjustment of image quality.

Then, when the user depresses the screen selection button B21 on the image quality adjustment screen G4, the control section 110 displays the screen selection screen.

FIG. 15 is a diagram showing an example of the screen selection screen G5.

As shown in FIG. 15, the screen selection screen G5 is provided with a line button B31, second line button B32, dot button B33, second dot button B34, prioritize compression ratio button B35, automatic button B36, OK button B37 and cancel button B38, etc.

The line button B31, second line button B32, dot button B33, second dot button B34, prioritize compression ratio button B35, and automatic button B36 receive selection of various screen processing. The line button B31 receives setting of the screen processing which uses a line pattern. The second line button B32 receives setting of the screen processing which uses a line pattern different from the line pattern used in the screen processing when the line button B31 is depressed. The dot button B33 receives setting of the screen processing which uses a dot pattern. The second dot button B34 receives setting of the screen processing which uses a dot pattern different from the dot pattern used in the screen processing when the dot button B33 is depressed. The prioritize compression ratio button B35 receives setting of the screen processing which uses error diffusion. The automatic button B36 receives setting of the screen processing set in advance (for example, the screen processing which uses a line pattern).

When the user depresses any one of the buttons (B31 to B36) to select various screen processing on the screen selection screen G5, the control section 110 receives setting of the screen processing corresponding to the depressed button.

The control section 110 refers to the density unevenness correction table and reads out the correction value of each output color corresponding to the paper type read out in step S23, the basis weight read out in step S24 and the screen processing set in step S25 (step S26).

When the start button of the hardware key of the operation/display section 30 is depressed, in other words, when the output instruction of the image is received (step S27), the control section 110 judges whether or not the correction value read out in step S26 is set (step S28). In the judgment of whether or not the correction values are set in step S28, when all of the read out correction values are "FF", it is judged that the correction value is not set, and when not all of the values are "FF", it is judged that the correction value is set.

When the correction value is not set (step S28; NO), the control section 110 displays a warning screen on the operation/display section 30 (step S29).

Figure 16:
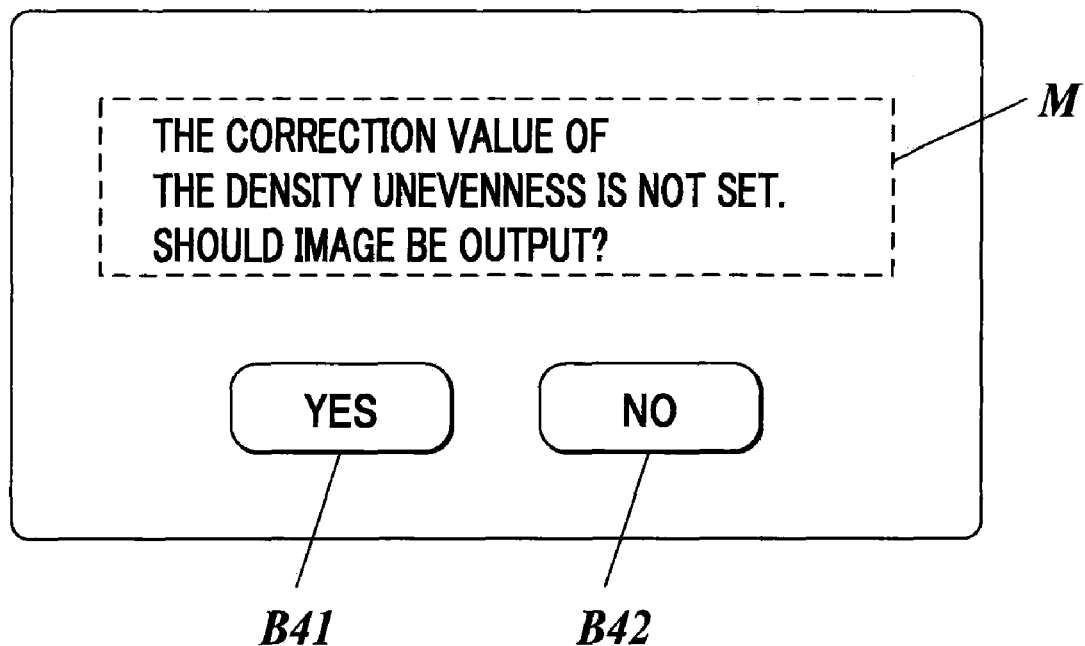
FIG. 16 is a diagram showing an example of a warning screen.

FIG. 16 is a diagram showing an example of a warning screen G6.

As shown in FIG. 16, the warning screen G6 is provided with a message area M, YES button B41 and NO button B42. In the message area M, a message to notify the correction value is not set and to ask whether or not to output the image is displayed, such as, "The correction value of the density unevenness is not set. Should image be output?".

The warning screen G6 functions as a notification section to notify the user of notification information (message) to notify the correction value is not set when the correction value corresponding to the image forming condition is not in the density unevenness correction table of the nonvolatile memory 120, in other words, the correction value is set to "FF".

The control section 110 judges whether or not an instruction to output the image is received (step S30). The judgment in step S30 is performed by judging whether or not the user depressed the YES button B41 on the warning screen G6.

When the instruction to output the image is received, in other words, when the YES button B41 is depressed (step S30; YES), the control section 110 sets all read out correction values to 0 and advances to step S31.

When the instruction to output the image is not received, in other words, when the NO button B42 is depressed (step S30; NO), the control section 110 ends the image output processing.

When the correction value read out in step S26 is set (step S28; YES), the control section 110 sets each section of the image forming apparatus 1 according to the image forming condition corresponding to the read out correction value, in other words the paper type read out in step S23, the basis weight read out in step S24 and the screen processing received in step S25 (step S31). Also, the control section 110 outputs the correction value read out in step S26 to the density unevenness correction section 141 and performs setting of the density unevenness correction section 141.

The control section 110 allows the image processing section 140 to perform image processing including density unevenness correction on the specified image data in the image memory 130 and outputs the image data on which the image processing is performed to the print section 40. Then, the print section 40 forms an image on the paper set based on the image data input from the control section 110 and outputs the image on the paper (step S32) and the image output processing ends.

As described above, according to the present embodiment, the correction of the density of each pixel of the image data can be performed based on the correction value according to the image forming condition, and the density unevenness due to the image forming condition can be decreased and the image density can be equalized.

Especially, correction of density suitable for screen processing can be performed, and the density unevenness which occurs due to the screen processing can be reduced. Also, the correction of density suitable for the paper type and the basis weight can be performed, and the density unevenness which occurs due to the paper type and the basis weight can be reduced. Further, the density unevenness which occurs according to the color used to form the image can be decreased.

Further, since the correction chart based on the image data including the image forming code showing the image forming condition and the image for correction can be output with respect to each image forming condition, the user can distinguish which correction chart is the image for correction of which image forming condition.

Also, the input correction value with respect to each image forming condition can be stored in the density unevenness correction table. Therefore, the density unevenness correction can be performed using the correction value according to the image forming condition depending on the user's preference.

Also, when the correction value of the image forming condition is "FF", the warning screen to notify that the correction value is not set is displayed. Therefore, the user is able to know the correction value to perform density unevenness correction is not set and the user is able to obtain an opportunity to perform setting of the correction value of the image forming condition in which the correction value is not set before the image is output. Therefore, needless image output where density unevenness correction is not performed can be prevented.

In the above description, an example is disclosed where a nonvolatile memory 120 is used as the computer readable medium of the program of present invention, however the example is not limited to the above example. As other computer readable media, nonvolatile memory such as flash memory and a portable storage medium such as a CD-ROM can be applied. Also, as a medium to provide data of the program of the present invention through communication lines, a carrier wave can be applied to the present invention.

Also, the present invention is not limited to the above described embodiments, and can be suitably modified without leaving the scope of the present invention.

According to an aspect of the preferred embodiments of the present invention, there is provided an image forming apparatus including:

an image forming section to form an image on paper based on image data according to an image forming condition to output the image on the paper;

a storage section to store a plurality of correction values corresponding to setting conditions of the image forming condition, the correction values used for correction of density unevenness in a main scanning direction of the image;

a density correction section to perform correction of density of each pixel of the image data based on the correction value; and a control section to read out the correction value according to a set condition in the image forming condition from the storage section and to allow the density correction section to perform the correction of the density of each pixel of the image data based on the read out correction value.

According to another aspect of the preferred embodiments of the present invention, there is provided a density unevenness correction method in an image forming apparatus to form an image on paper based on image data according town image forming condition to output the image on the paper, the method comprising:

storing in advance a plurality of correction values corresponding to setting conditions of the image forming condition in a storage section, the correction values used for correction of density unevenness in a main scanning direction of the image;

receiving setting of the image forming condition;

reading out the correction value according to a set image forming condition from the storage section to allow the density correction section to perform the correction of the density of each pixel of the image data based on the read out correction value;

outputting an image based on the corrected image data on the paper according to the set image forming condition.

According to the image forming apparatus and the density unevenness correction method of the image forming apparatus of the present embodiment, correction of the density of each pixel of the image data can be performed based on the correction value according to the image forming condition. Therefore, the density unevenness due to the image forming condition can be reduced and the image density can be equalized.

Preferably, in the image forming apparatus, the image forming condition is a condition of screen processing performed on the image data.

Consequently, correction of density suitable for screen processing can be performed, and density unevenness due to the screen processing can be reduced.

Preferably, in the image forming apparatus, the image forming condition is a condition of a type of the paper.

Consequently, correction of density suitable for the type of paper can be performed, and density unevenness due to the type of paper can be reduced.

Preferably, in the image forming apparatus, the image forming condition is a condition of a basis weight of the paper.

Consequently, correction of density suitable for the basis weight of the paper can be performed, and density unevenness due to the basis weight of the paper can be reduced.

Preferably, in the image forming apparatus, the image forming condition is a condition of a color used to form the image.

Consequently, density unevenness due to color used to form the image can be reduced.

Preferably, in the image forming apparatus, the control section generates image data including an image forming condition information image to show the image forming condition and an image for correction; and the image forming section forms the image data generated by the control section on the paper and outputs a correction chart with respect to each image forming condition.

Preferably, the density unevenness correction method in the image forming apparatus further includes:

generating image data including an image forming condition information image to show the image forming condition and an image for correction; and forming the generated image data on the paper to output a correction chart with respect to each image forming condition.

Consequently, the correction chart based on the image data including the image forming condition information image to show the image forming condition and the correction image can be output with respect to each image forming condition.

Preferably, the image forming apparatus further includes an input section to input the correction value with respect to each image forming condition based on the correction chart, wherein the control section allows the storage section to store the correction value with respect to each image forming condition input on the input section.

Preferably, the density unevenness correction method in the image forming apparatus further includes:

storing the correction value with respect to each image forming condition input based on the correction chart in the storage section.

Consequently, the input correction value with respect to each image forming condition can be stored. Therefore, the density unevenness correction can be performed using the correction value according to the image forming condition depending on the user's preference.

Preferably, the image forming apparatus, further includes a notification section to notify notification information, wherein the control section allows the notification section to notify notification information to notify the correction value is not set when the correction value of the image forming condition is not stored in the storage section when allowing the image forming section to form an image on the paper based on the image data according to the image forming condition.

Preferably, the density unevenness correction method in the image forming apparatus further includes:

notifying with the notification section that the correction value is not set when the correction value of the image forming condition is not stored in the storage section when the image is output on the paper according to the image forming condition.

Consequently, when there is no correction value for the image forming condition in the storage section, it can be notified that the correction value is not set.

Preferably, in the image forming apparatus, the correction value includes the correction values of a plurality of positions in the main scanning direction.

Consequently, the correction values in a plurality of positions in the main scanning direction can be used.

Preferably, in the image forming apparatus, the storage section stores a plurality of correction values corresponding to a combination of setting conditions set with respect to each one of a plurality of image forming conditions.

Consequently, a plurality of correction values corresponding to the combination of the setting condition of a plurality of image forming conditions can be used.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present U.S. patent application claims priority under the Paris Convention of Japanese Patent Application No. 2008-316468 filed on Dec. 12, 2008 to the Japanese Patent Office, which shall be a basis for correcting mistranslations.

What is claimed is:

1. An image forming apparatus comprising:
   an image forming section to form an image on paper based on image data according to an image forming condition to output the image on the paper;
   a storage section to store a plurality of correction values corresponding to setting conditions of the image forming condition, the correction values used for correction of density unevenness in a main scanning direction of the image;
   a density correction section to perform correction of density of each pixel of the image data based on the correction value;
   a control section to read out the correction value according to a set condition in the image forming condition from the storage section and to allow the density correction section to perform the correction of the density of each pixel of the image data based on the read out correction value; and
   a notification section to notify notification information, wherein
   the control section allows the notification section to notify notification information to notify the correction value is not set when the correction value of the image forming condition is not stored in the storage section when allowing the image forming section to form an image on the paper based on the image data according to the image forming condition.

2. The image forming apparatus of claim 1, wherein the image forming condition is a condition of screen processing performed on the image data.

3. The image forming apparatus of claim 1, wherein the image forming condition is a condition of a type of the paper.

4. The image forming apparatus of claim 1, wherein the image forming condition is a condition of a basis weight of the paper.

5. The image forming apparatus of claim 1, wherein the image forming condition is a condition of a color used to form the image.

6. The image forming apparatus of claim 1, wherein
   the control section generates image data including an image forming condition information image to show the image forming condition and an image for correction; and
   the image forming section forms the image data generated by the control section on the paper and outputs a correction chart with respect to each image forming condition.

7. The image forming apparatus of claim 6, further comprising an input section to input the correction value with respect to each image forming condition based on the correction chart, wherein
   the control section allows the storage section to store the correction value with respect to each image forming condition input on the input section.

8. The image forming apparatus of claim 1, wherein the correction value includes the correction values of a plurality of positions in the main scanning direction.

9. The image forming apparatus of claim 1, wherein the storage section stores a plurality of correction values corresponding to a combination of setting conditions set with respect to each one of a plurality of image forming conditions.

10. A density unevenness correction method in an image forming apparatus to form an image on paper based on image data according to an image forming condition to output the image on the paper, the method comprising:
    storing in advance a plurality of correction values corresponding to setting conditions of the image forming condition in a storage section, the correction values used for correction of density unevenness in a main scanning direction of the image;
    receiving setting of the image forming condition;
    reading out the correction value according to a set image forming condition from the storage section to allow the density correction section to perform the correction of the density of each pixel of the image data based on the read out correction value;
    outputting an image based on the corrected image data on the paper according to the set image forming condition; and
    notifying with a notification section that the correction value is not set when the correction value of the image forming condition is not stored in the storage section when the image is output on the paper according to the image forming condition.

11. The density unevenness correction method in the image forming apparatus of claim 10, wherein the image forming condition is a condition of screen processing performed on the image data.

12. The density unevenness correction method in the image forming apparatus of claim 10, wherein the image forming condition is a condition of a type of the paper.

13. The density unevenness correction method in the image forming apparatus of claim 10, wherein the image forming condition is a condition of a basis weight of the paper.

14. The density unevenness correction method in the image forming apparatus of claim 10, wherein the image forming condition is a condition of a color used to form the image.

15. The density unevenness correction method in the image forming apparatus of claim 10, further comprising:

generating image data including an image forming condition information image to show the image forming condition and an image for correction; and forming the generated image data on the paper to output a correction chart with respect to each image forming condition.

16. The density unevenness correction method in the image forming apparatus of claim 15, further comprising:

storing the correction value with respect to each image forming condition input based on the correction chart in the storage section.

17. The density unevenness correction method in the image forming apparatus of claim 10, wherein the correction value includes the correction values of a plurality of positions in the main scanning direction.

18. The density unevenness correction method in the image forming apparatus of claim 10, wherein the storage section stores a plurality of correction values corresponding to a combination of setting conditions set with respect to each one of a plurality of image forming conditions.

* * * * *